United States Patent
Mo et al.

(10) Patent No.: US 9,305,093 B2
(45) Date of Patent: Apr. 5, 2016

(54) SYSTEMS, METHODS, AND COMPUTER PROGRAM PRODUCTS FOR GESTURE-BASED SEARCH AND DISCOVERY THROUGH A TOUCHSCREEN INTERFACE

(71) Applicant: Intel Corporation, Santa Clara, CA (US)

(72) Inventors: Stanley Mo, Portland, OR (US); Victor Szilagyi, London (GB); Rita H. Wouhaybi, Portland, OR (US); Tobias M. Kohlenberg, Portland, OR (US); Steven J. Birkel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 13/628,810

(22) Filed: Sep. 27, 2012

(65) Prior Publication Data
US 2014/0089863 A1     Mar. 27, 2014

(51) Int. Cl.
*G06F 3/033* (2013.01)
*G06F 17/30* (2006.01)
*G06F 3/0488* (2013.01)

(52) U.S. Cl.
CPC ...... *G06F 17/30864* (2013.01); *G06F 3/04883* (2013.01)

(58) Field of Classification Search
CPC ........................................................ G06F 3/033
USPC ........................................................ 715/863
See application file for complete search history.

(56) References Cited

U.S. PATENT DOCUMENTS

2007/0192305 A1*  8/2007  Finley et al. ...................... 707/4
2012/0197857 A1*  8/2012  Huang et al. .................. 707/706

* cited by examiner

*Primary Examiner* — Peiyong Weng
(74) *Attorney, Agent, or Firm* — Garrett IP, LLC

(57) ABSTRACT

A touchscreen-based user interface that allows the user to perform information searching on a mobile information appliance, such as a tablet computer or smart phone. By moving one or two fingers in appropriate direction(s) across the touchscreen, a search may be specified. Moreover, by using the appropriate gestures, a search may be broadened or narrowed by specifying additional search terms. This may be performed iteratively to allow the user to discover information, at various times narrowing or broadening a search.

30 Claims, 13 Drawing Sheets

SYSTEMS, METHODS, AND COMPUTER PROGRAM PRODUCTS FOR GESTURE-BASED SEARCH AND DISCOVERY THROUGH A TOUCHSCREEN INTERFACE

BACKGROUND

Information searching is a well-known problem, but one that has become easier in the context of high-speed information networks such as the Internet. Moreover, it is now possible to perform searches using portable computing devices, such as tablets or smart phones.

Conventional graphical user interfaces (GUIs) used in searching can sometimes be problematic on such devices. The user may typically have to highlight or otherwise open a data entry window, and then type in a term. In other cases, scroll down menus may be opened up or the user transferred to a new and different window entirely. The touchscreens are small, and the keyboards used in the entry of search terms are necessarily smaller. This makes it difficult to supply a search term. Additional menus or changes in screen (shifting to another window) is cognitively disruptive and distracting to the end-user. One situation that exemplifies the awkwardness of such an interface is that of a two-screen user experience. Here, the user may be watching a primary source of content, such as a sporting event or documentary on television. One or more second devices may be used, where such a device is generally a smaller mobile platforms such as a smart phone or tablet computer. These devices may be connected to the television or have access to the same content source as the television, and may be used by the viewer to discover additional content related to the television program. In a typical two screen experience, the user must highlight a data entry window on the mobile display, bring up a keyboard, and type in a search term. As noted above, this may be physically difficult. Such interaction may also be disruptive and time-consuming in the context of the primary experience (in this example, watching television). The result is a bad user experience, disruption, and the need for the user to "think" in an environment that might be intended to relax the user.

BRIEF DESCRIPTION OF THE DRAWINGS/FIGURES

Figure 1:
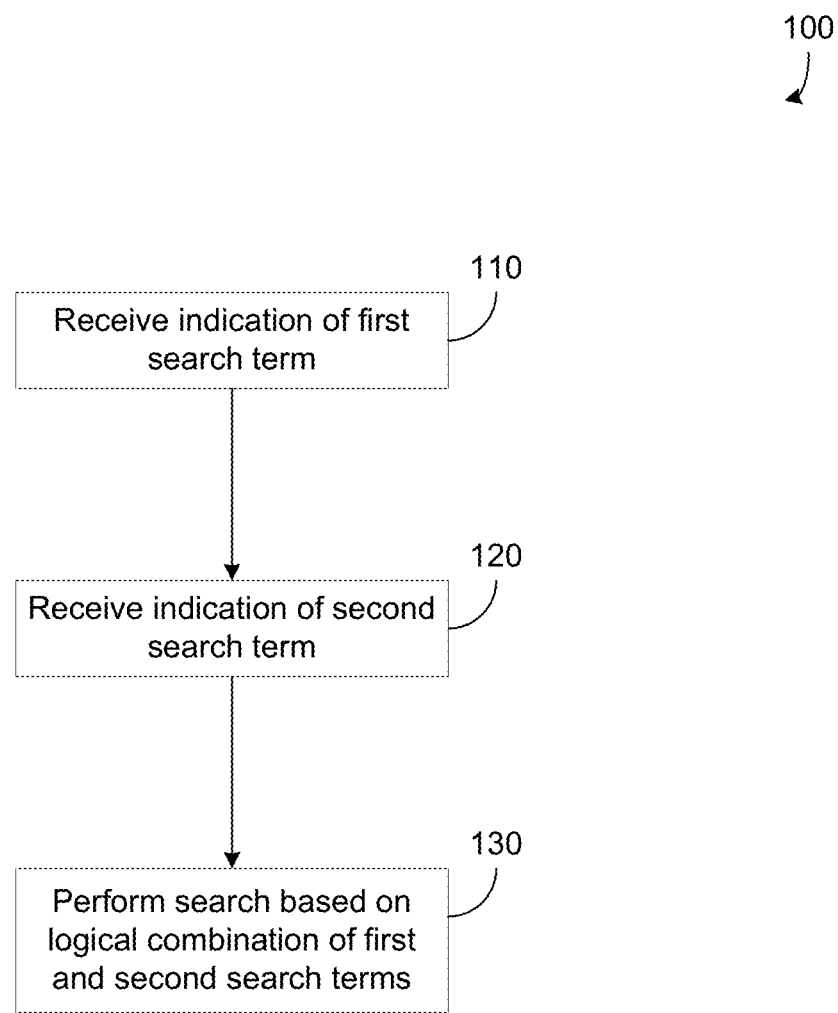
FIG. 1 is a flowchart illustrating the overall processing of the system described herein, according to an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Conventional GUIs used in information searching can be problematic on handheld devices. Given that touchscreens are small and their keyboards are necessarily smaller, the typing of search terms may be difficult. This may be particularly true in a two-screen user experience. Here, the user may be watching a primary source of content. One or more second devices may be used, where such a device is generally a smaller mobile platform such as a smart phone or tablet computer. These devices may be connected to the television or have access to the same content source as the television, and may be used by the viewer to discover additional content related to the television program. In a typical two screen experience, the user must highlight a data entry window on the mobile display, bring up a keyboard, and type in a search term. This may be physically difficult, disruptive, and time-consuming in the context of the overall experience.

The systems, methods, and computer program products described herein may provide a touchscreen-based user interface that allows the user to perform information searching on a mobile computing device, such as a tablet computer or smart phone. By moving one or two fingers in appropriate direction(s) across the touchscreen, a search may be specified. Moreover, by using the appropriate gestures, a search may be broadened or narrowed by specifying additional search terms. This may be performed iteratively to allow the user to discover information, at various times narrowing or broadening a search.

The overall processing of the system described herein is illustrated in FIG. 1, according to one embodiment. At 110, an indication of a first search term may be received. At 120, and indication of a second search term may be received. The manner in which the search terms may be indicated will be discussed in greater detail below. At 130, a search may be performed based on a logical combination of the first and second search terms. For example, the search may be performed using the first and second search terms combined using a logical AND function. Alternatively, the search may be performed using the first and second search terms combined using a logical OR function. These possibilities are not meant to be limiting, and the search may be performed using any logical function of the indicated terms.

Figure 2:
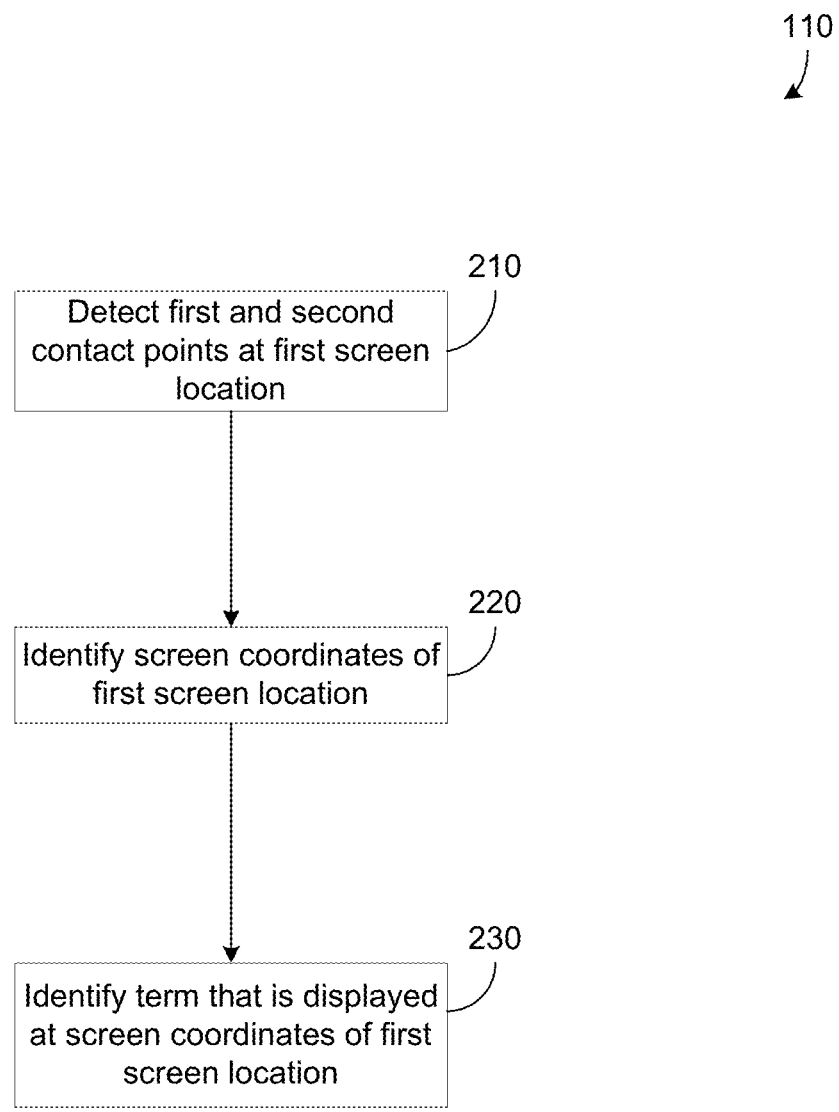
FIG. 2 is a flowchart illustrating the receiving of an indication of a first search term, according to an embodiment.

In an embodiment, indications of the search terms may be received from a user through a GUI on a touchscreen of a computing device. Receiving an indication of the first search term (110 of FIG. 1) is illustrated in greater detail in FIG. 2, according to an embodiment. At 210, first and second contact points may be detected on the touchscreen, generally coinciding at a first screen location initially. In an embodiment, the first and second contact points may represent points at which the user has placed two fingertips on the touchscreen. At 220, the screen coordinates of the first screen location may be identified. At 230, a term that is displayed at the screen coordinates of the first screen location may be identified as the first search term.

Figure 3:
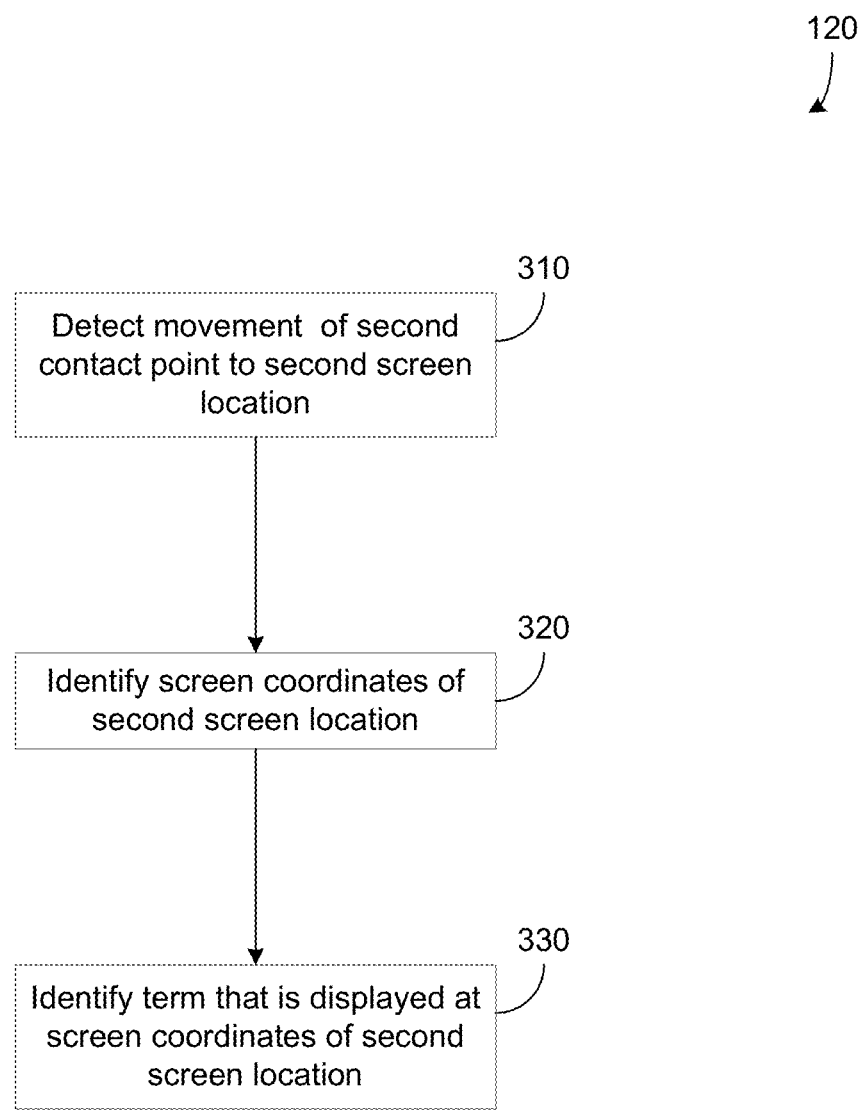
FIG. 3 is a flowchart illustrating the receiving of an indication of a second search term, according to an embodiment.

Receiving an indication of the second search term (120 of FIG. 2) is illustrated in FIG. 3, according to an embodiment. At 310, the movement of the second contact point to a second screen location may be detected. At 320, the screen coordinates of the second screen location may be identified. At 330, the term displayed at the screen coordinates of the second screen location may be identified. The term at this second screen location may be used as the second search term. For example, if the user initially places both fingers on a first search term, then moves one of the fingers to the right in a horizontal direction so as to rest on a second term, then this stretching motion may be used to narrow a search to cover a logical AND function of the two search terms. In an alternative embodiment, this stretching motion may be used to broaden a search to cover a logical OR function of the two search terms.

Figure 4:
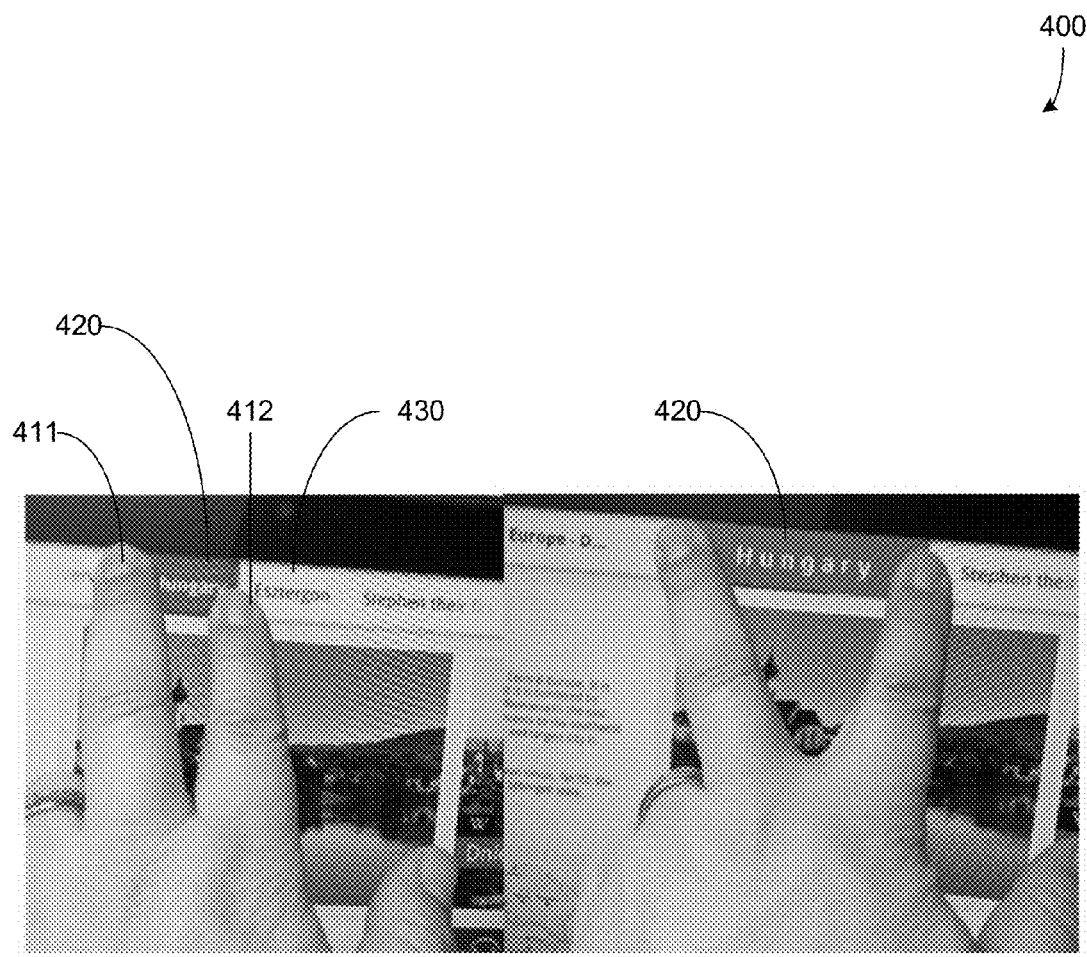
FIG. 4 is an illustration of user operation of the system described herein, according to an embodiment.

In an alternative embodiment, this horizontal stretching motion may actually stretch the image of the first search term and cover the second. Such an embodiment is shown in FIG. 4. Here, a user is shown with two contact points 411 and 412, both at the same approximate screen location coinciding with a first term 420 ("Hungary"). The contact point 412, made by the right finger, is then moved to the right in a horizontal stretching motion. In the illustrated embodiment, the image of the first term 420 is stretched. In so doing, the adjacent term 430 on the right ("Eszergon") is covered. The adjacent term 430 may then be treated as the second term for purposes of the search. In an alternative embodiment, the stretching motion may cover more than one additional term. In such a case, all the terms covered by the stretching motion may be used as terms for searching purposes. Moreover, the stretching motion may go in both left and right directions, so that terms on either side of first term 410 may be included in the search term. Alternatively, the motion may be horizontal. The search may be performed using any logical function of the indicated search terms, e.g., AND, OR, or any combination thereof.

Figure 5:
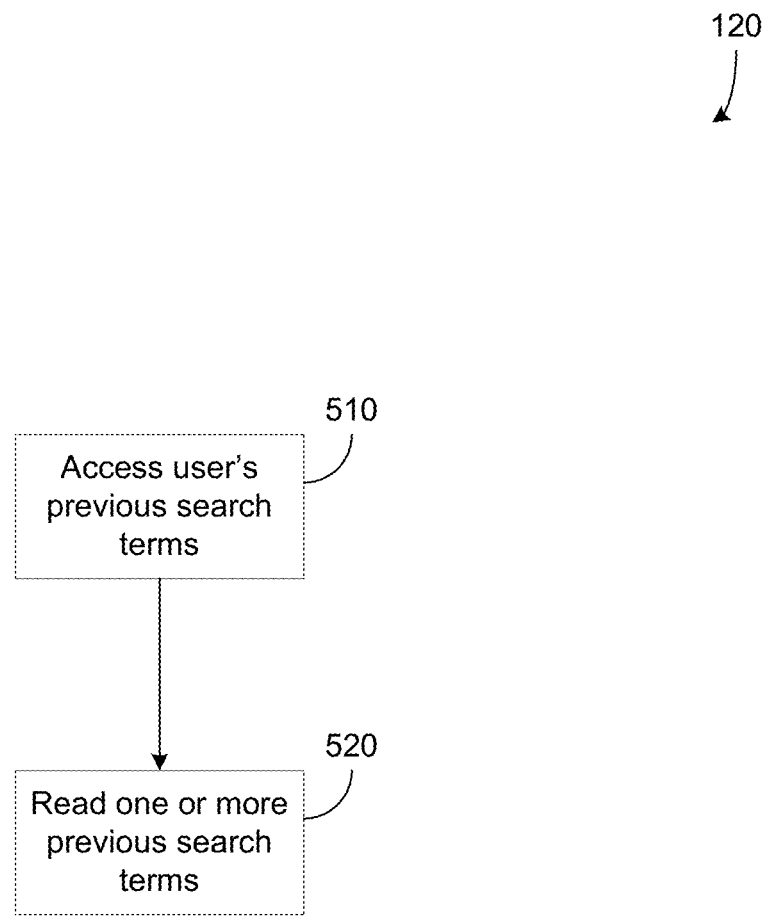
FIG. 5 is a flowchart illustrating the receiving of an indication of a second search term, according to an alternative embodiment.

In another embodiment, the second search term may not necessarily be displayed on the touchscreen, but may instead be a term that was previously used and saved. This is illustrated in FIG. 5. Here, receiving an indication of the second search term (120 of FIG. 1) comprises accessing the user's previous search terms at 510. At 520, one of the previous search terms is read and used as the second search term. In an embodiment, these operations may take place when the user places two fingertips on the first search term, them performs a vertical stretching motion. This may include moving one finger vertically away from the other, or moving both fingers away from each other simultaneously. Moreover, the previous search term (used as the second search term in this case) may be the most recently used search term. In other embodiments, an extended vertical stretching motion may cause multiple previous search terms to be used, assuming that the previous search terms have been saved. As noted above, the first, second, and any subsequent search terms accessed in this manner may be combined in any logical function for search purposes. In an embodiment, these terms may be combined so as to perform a narrow search that incorporates all the search terms, to "drill down" from the first search term. Alternatively, this result may be obtained by using a horizontal stretching motion. In an embodiment, a contraction motion can also be performed, bringing the two fingers together, to remove search terms from a search. In another embodiment, "stretching" of the term may be a signal to the underlying search engine to continue searching on this term, but to broaden the potential scope parameters of the term. In this way, the modified search in effect expands or loosens the search term's definition to include other related definitions or results which would not have shown up, conventionally, in an ordinary search.

Figure 6:
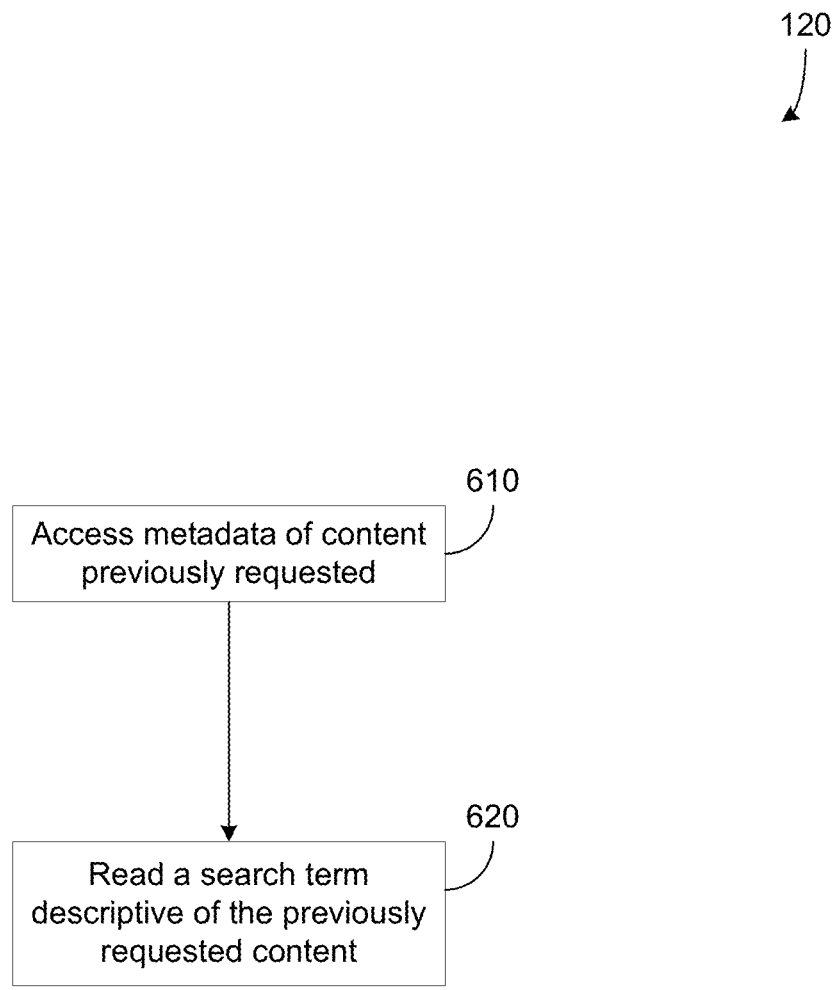
FIG. 6 is a flowchart illustrating the receiving of an indication of a second search term, according to an alternative embodiment.

In another embodiment, the second search term may be based on content that was previously accessed by the user. This is illustrated in FIG. 6. At 610, the metadata of previously requested content may saved and subsequently made available for access. At 620, the metadata may be read to obtain a search term that is in some way descriptive of the previously requested content, e.g., a key word, theme, or date. This search term may then be used as the second search term. As in the previously discussed embodiment, these operations may take place when the user places two fingertips on the first search term, them performs a vertical stretching motion. This may include moving one finger vertically away from the other, or moving both fingers away from each other simultaneously. Moreover, the accessed search term used as the second search term may be taken from metadata related to the most recently requested content. In other embodiments, an extended vertical stretching motion may cause multiple search terms to be accessed, e.g., from metadata related to several recently requested pieces of content, and/or multiple search terms taken from the metadata of the most recently requested content. As before, the first, second, and any subsequent search terms accessed in this manner may be combined in any logical function for search purposes. In an embodiment, these terms may be combined so as to perform a narrow search that incorporates all the search terms, to "drill down" from the first search term. Alternatively, this result may be obtained by using a horizontal stretching motion. In an embodiment, a contraction motion can also be performed, bringing the two fingers together, to remove search terms from a search. In another embodiment, the user may use two fingers to press and hold the search term as a means of initiating a "drill down" command. The use of two fingers would distinguish this command from a single finger press-and-hold, which would otherwise lead to a copy/paste/cut command on many platforms.

Figure 7:
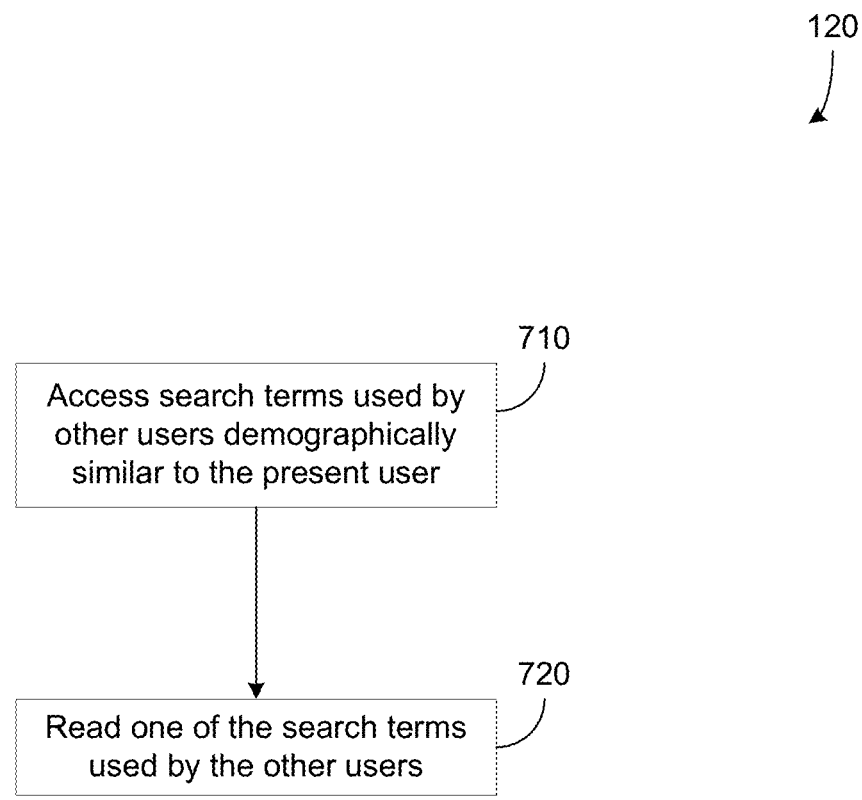
FIG. 7 is a flowchart illustrating the receiving of an indication of a second search term, according to an alternative embodiment.

In an alternative embodiment, the second search term may be one that was used in the past by other users who have some demographic similarity to the user. Such an embodiment is illustrated in FIG. 7. At 710, search terms may be accessed, where these search terms have been used by other users who are demographically similar to the present user. At 720, one of these search terms may be read and used as the second search term. As in the previously discussed embodiment, these operations may take place when the user places two fingertips on the first search term, them performs a vertical stretching motion. This may include moving one finger vertically away from the other, or moving both fingers away from each other simultaneously. In an alternative embodiment, a horizontal stretching motion may be used. Moreover, the accessed search term used as the second search term may be the most recently used search term as used by demographically similar users. Alternatively, the accessed search term may be the most commonly used search term by the demographically similar users. In other embodiments, an extended vertical (or horizontal) stretching motion may cause multiple search terms to be accessed. As before, the first, second, and any subsequent search terms accessed in this manner may be combined in any logical function for search purposes. In an embodiment, these terms may be combined so as to perform a narrow search that incorporates all the search terms. In an embodiment, a contraction motion can also be performed, bringing the two fingers together, to remove search terms from a search.

Figure 8:
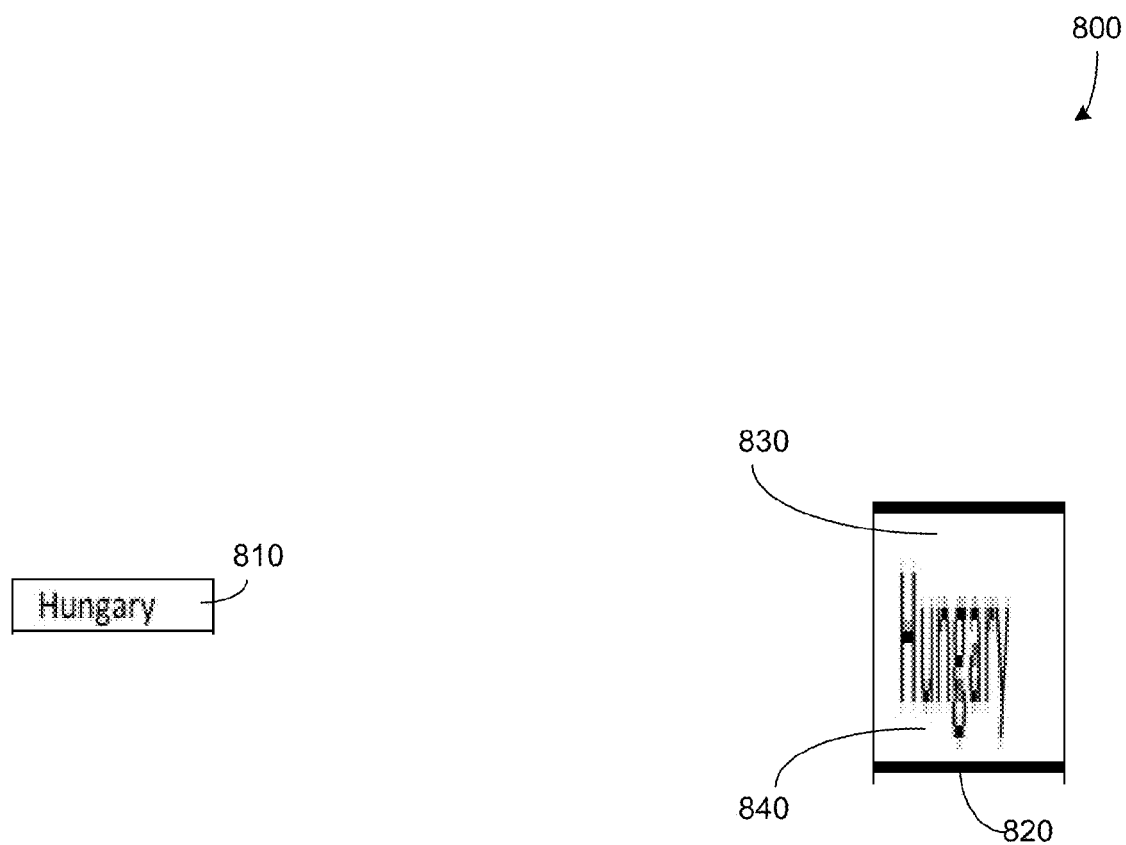
FIG. 8 is an illustration of user operation of the system described herein, according to an alternative embodiment.

The vertical stretching motion described above with respect to FIGS. 6 and 7 is illustrated in FIG. 8 according to an embodiment. Initially, the user may place two fingertips at a screen location coinciding with a first search term 810. By vertically separating the two fingertips, the image of the first search term may be vertically stretched. At this point, one fingertip may be at a contact point 830 and the second fingertip may be a contact point 840. The search term may then have a stretched appearance 820. This gesture may then be interpreted as a command to incorporate one or more additional search terms, as described above. As noted above, in an alternative embodiment the stretching may take place in a horizontal direction (not shown).

Figure 9:
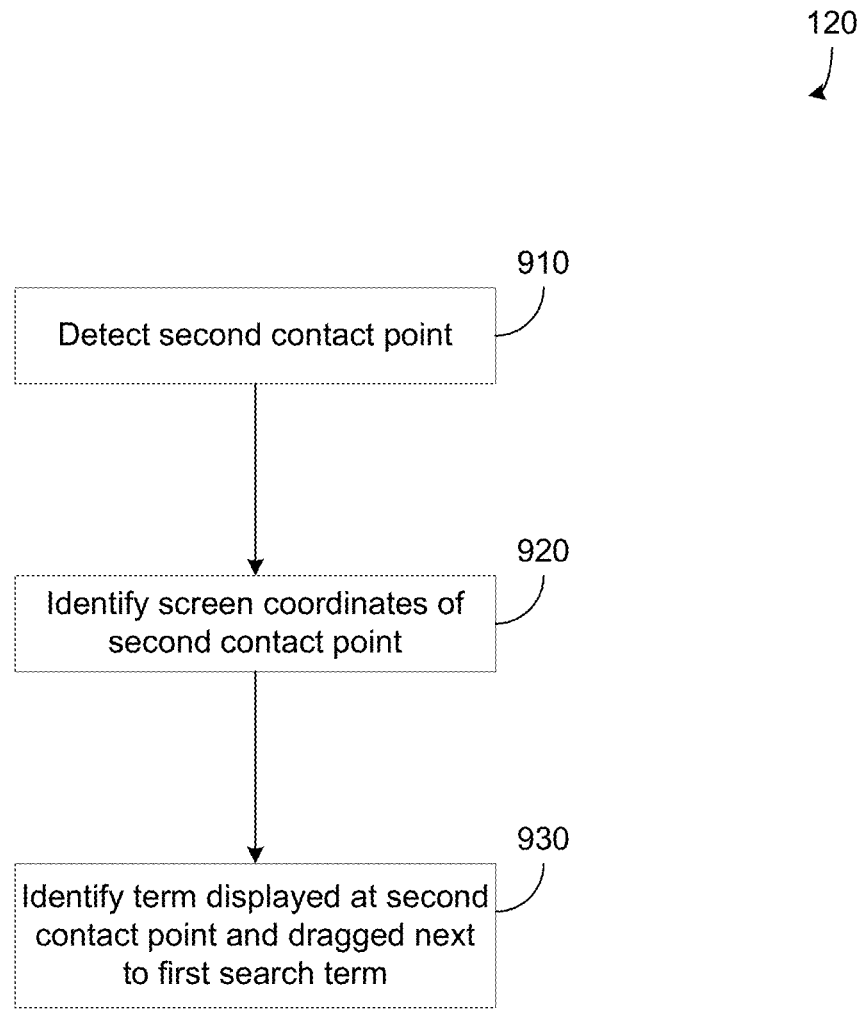
FIG. 9 is a flowchart illustrating the receiving of an indication of a second search term, according to an alternative embodiment.

In an alternative embodiment, receiving an indication of a second search term (120 of FIG. 1) may be performed as illustrated in FIG. 9. In this embodiment, the user may drag a second search term to a screen location next to the first search term. Here, a second contact point is detected at 910. At 920, the screen coordinates of the second contact point may be identified. At 930, a term that is displayed at the second contact point and dragged next to the first search term may be identified. The dragging of the second search term may then be interpreted as a command to logically combine the two search terms in a single search. As discussed above, this logical combination may comprise a logical AND or OR function, or any other logical function as would be understood by a person of ordinary skill in the art.

Figure 10:
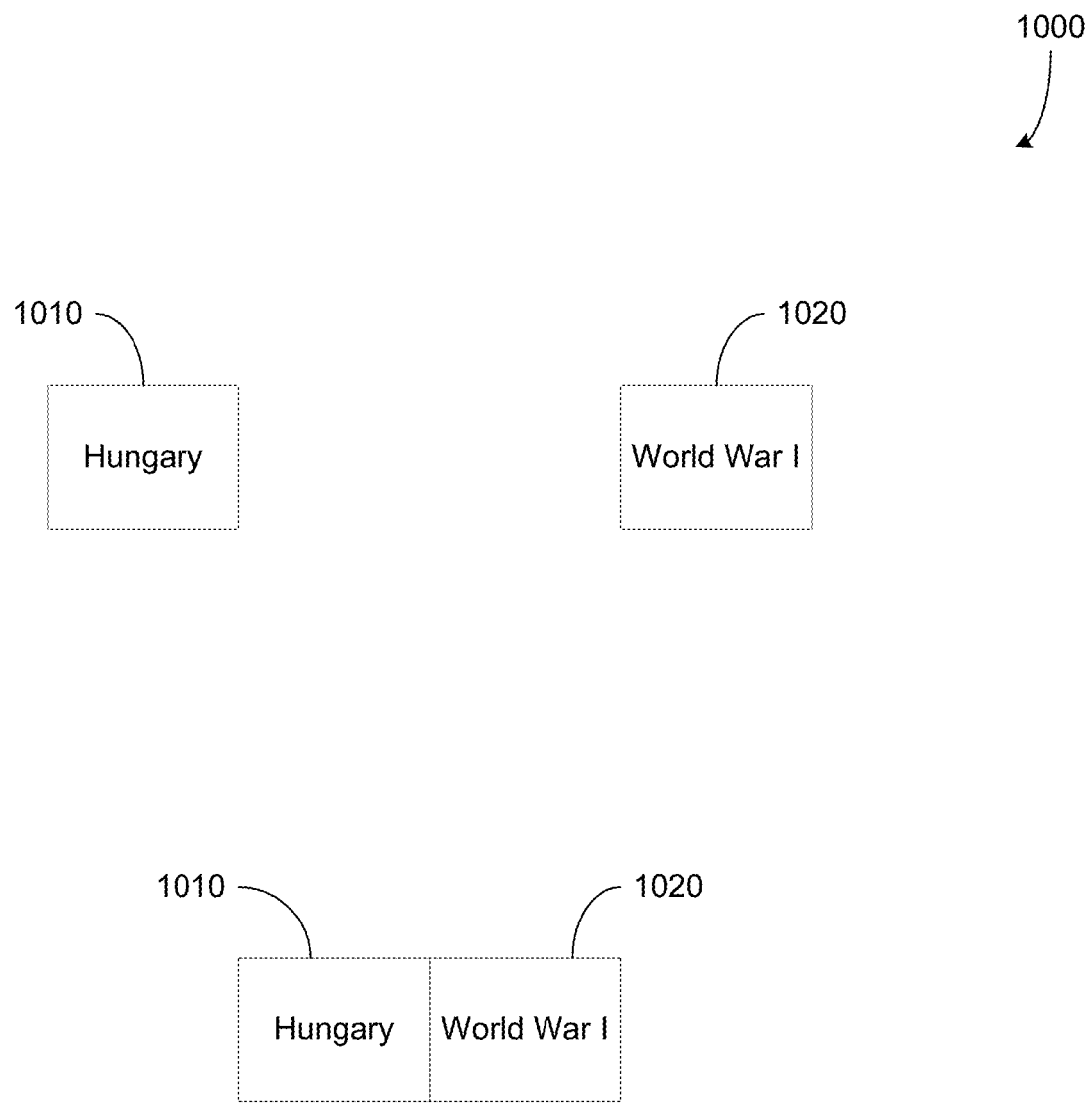
FIG. 10 is an illustration of user operation of the system described herein, according to an alternative embodiment.

Such an embodiment is illustrated in FIG. 10. A first search term 1010 ("Hungary") may be shown at a first screen location; a second search term 1020 ("World War I") may be displayed elsewhere at a second screen location. The second search term 1020 may then be dragged to a position next to the first search term 1010. This gesture may then be interpreted as a command to perform a search using both search terms. This search may use a logical OR operation specifying that the user is looking for information related to WWI or Hungary. This model may yield a large and wide results database. There may be no change in the outcome if the terms are reversed (Hungary-WWI versus WWI-Hungary) in an embodiment.

Figure 11:
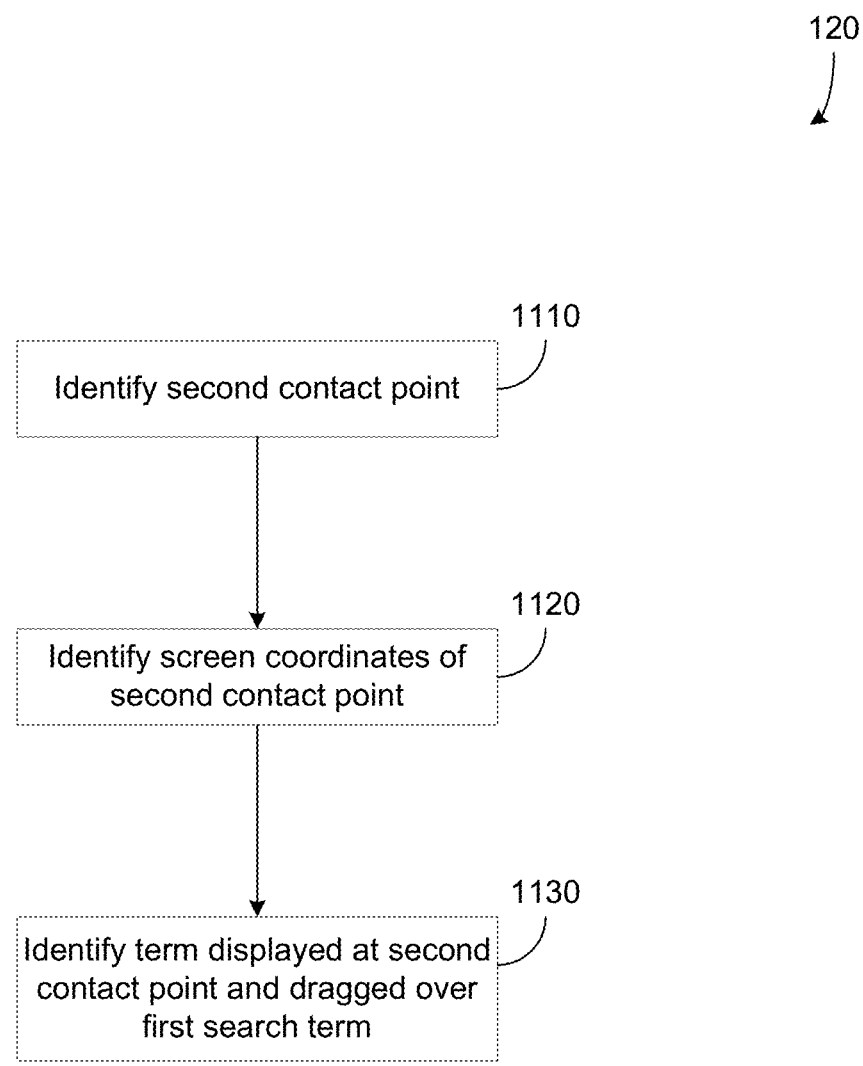
FIG. 11 is a flowchart illustrating the receiving of an indication of a second search term, according to an alternative embodiment.

In yet another embodiment, receiving an indication of a second search term (120 of FIG. 1) may be performed as illustrated in FIG. 11. In this embodiment, the user may drag a second search term on top of a first search term. Here, a second contact point is detected at 1110. At 1120, the screen coordinates of the second contact point may be identified. At 1130, a term displayed at the second contact point and dragged on top of the first search term may be identified. This dragging of the second search term may then be interpreted as a command to logically combine the two search terms in a single search. As discussed above, this logical combination may comprise a logical AND or OR function, or any other logical function.

Figure 12:
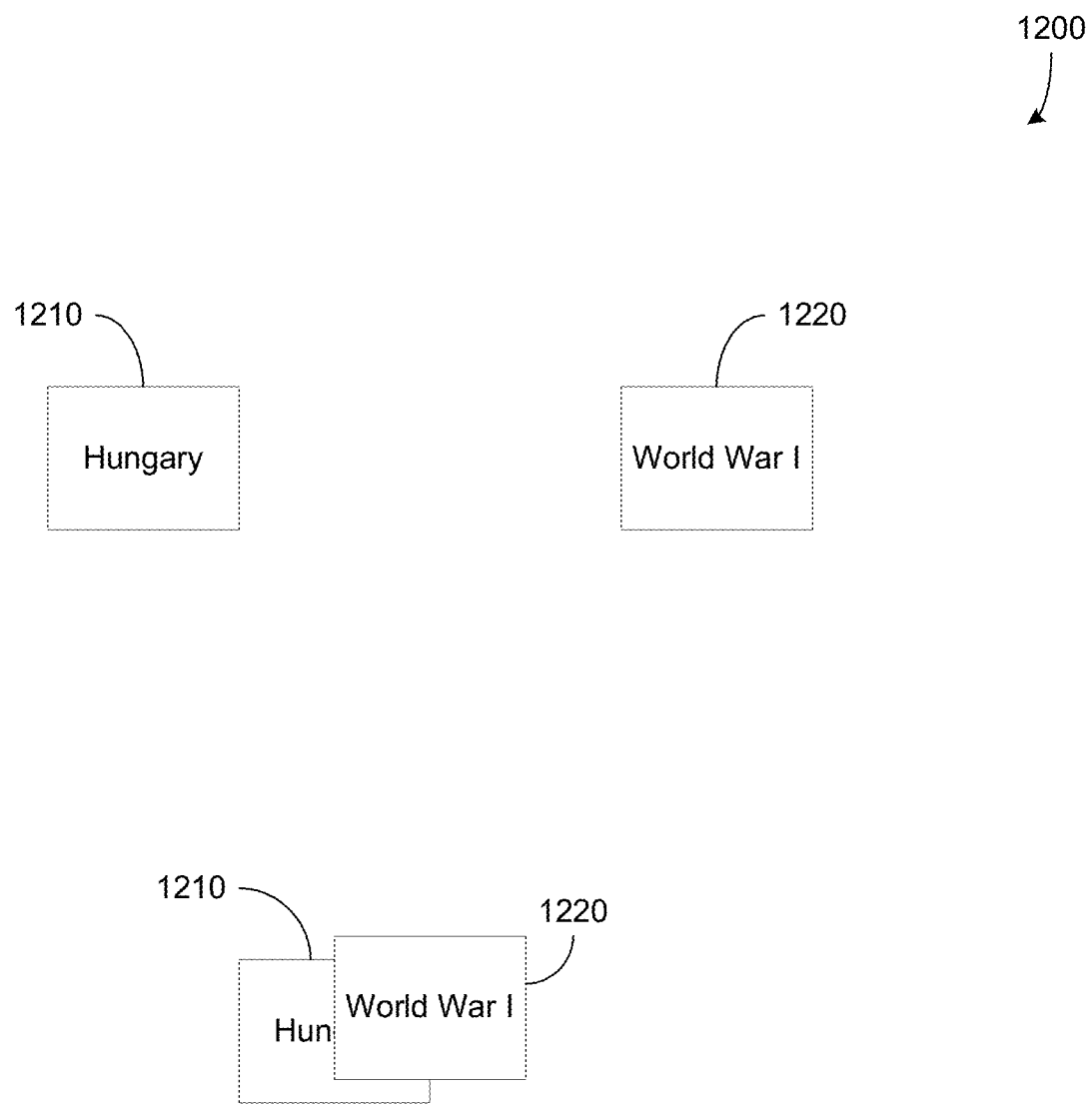
FIG. 12 is an illustration of user operation of the system described herein, according to an alternative embodiment.

Such an embodiment is illustrated in FIG. 12. A first search term 1210 ("Hungary") is shown at a first screen location; a second search term 1220 ("World War I") is displayed elsewhere at a second screen location on the touchscreen. The second search term 1220 is then dragged to a position on top of the first search term 1210. This gesture may then be interpreted as a command to perform a search using both search terms in a predefined logical combination. In an alternative embodiment, more than two search terms may be combined in this manner, so that multiple search terms may be dragged on top of the first search term. In this embodiment, placement of the order may be important. Filtering from large dataset to small as a result of the additional term(s) may be impacted by the starting point, i.e., the choice for the first term. Generally, starting with the largest dataset may yield the most results, but starting with the smaller dataset may improve the responsiveness and speed in obtaining results.

In another embodiment, any of the gestures described above may be combined to obtain additional search terms from the sources specified above. In other embodiments, other gestures may be used. For example, a twisting or rotating motion may be used, as if to turn a displayed term upside down. This may serve as the specification of the unary predicate NOT, e.g., "not Hungary" in a search. Note that rotating objects in this fashion does not necessarily require multiple fingers. The pressure points of a finger on a touchscreen surface may constitute an oval image, so rotation of the finger (and hence the oval imprint) may be sufficient for the platform logic to comprehend that a rotation is underway, the direction of the rotation, and the final orientation.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, ROM, RAM, or other data storage device.

In an embodiment, some or all of the processing described herein may be implemented as software or firmware. Such a software or firmware embodiment is illustrated in the context of a computing system 1300 in FIG. 13. System 1300 may include one or more central processing unit(s) (CPU) 1320 and a body of memory 1310 that may include one or more non-transitory computer readable media that may store computer program logic 1340. Memory 1310 may be implemented as a read-only memory (ROM) or random access memory (RAM) device, for example. CPU 1320 and memory 1310 may be in communication using any of several technologies known to one of ordinary skill in the art, such as a bus or a point-to-point interconnect. Computer program logic 1340 contained in memory 1310 may be read and executed by CPU 1320. In an embodiment, one or more I/O ports and/or I/O devices, shown collectively as I/O 1330, may also be connected to CPU 1320 and memory 1310. In an embodiment, I/O 1330 may include the touchscreen of the user's computing device.

Figure 13:
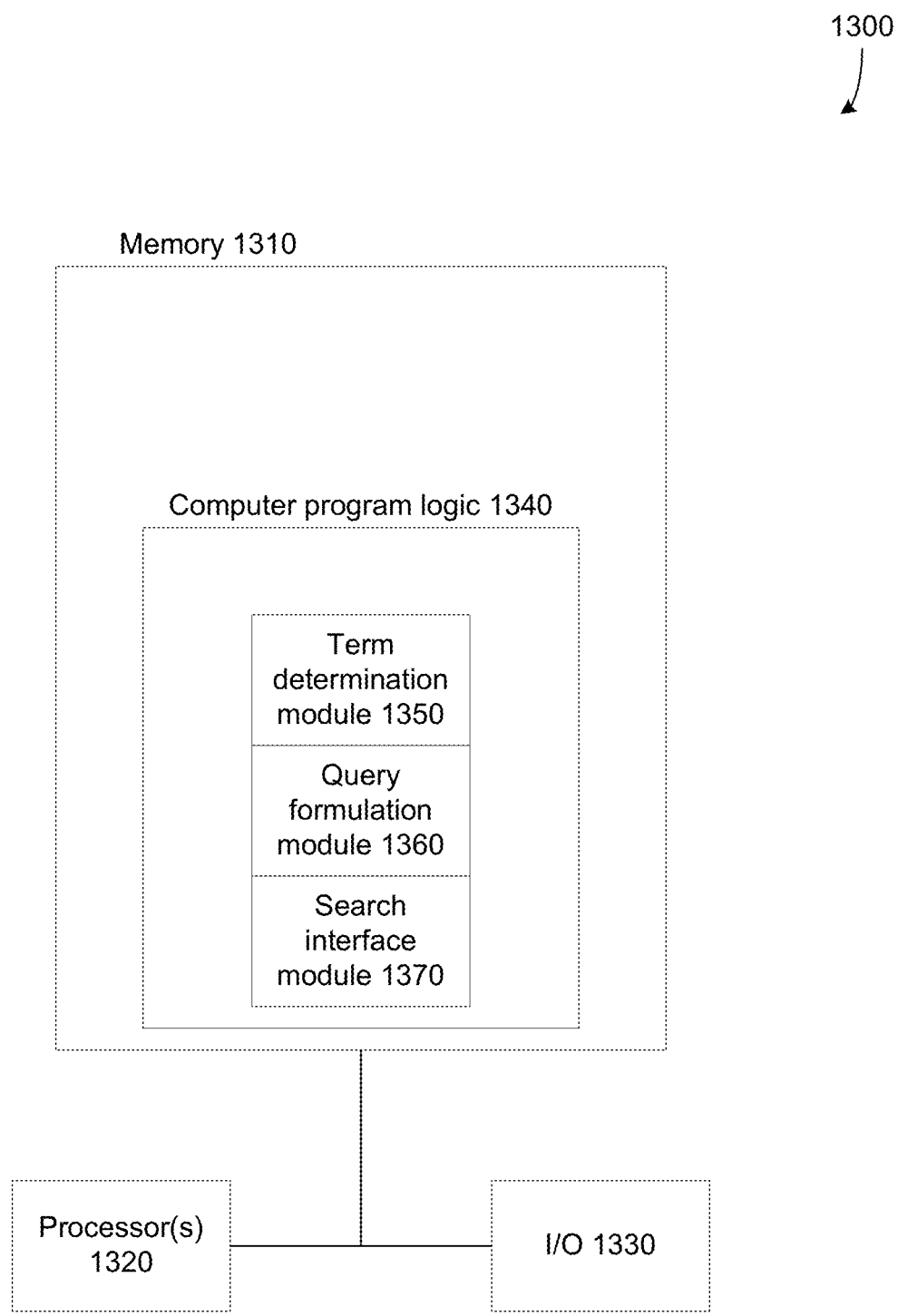
FIG. 13 is a block diagram illustrating a software or firmware embodiment of the system described herein.

In the embodiment of FIG. 13, computer program logic 1340 may include a module 1350 responsible for determining the search terms to be used in the search. As described above, this may include identifying a term displayed at a contact point on the touchscreen, identifying a previously used search term, and/or identifying a search term used by demographically similar users, for example. Computer program logic 1340 may also include a module 1360 responsible for formulating a query using the determined search terms. In addition to the search terms, the query formulation module 1360 may also determine the logic function to be used in combining the search terms, where the logic function may be dependent on the user's movement of the contact points, as discussed above. Computer program logic 1340 may include a module 1370 responsible for interfacing with a search engine. This logic may, for example, provide the formulated query to the search engine. In an embodiment, module 1370 may also receive search results from the search engine. Note that the search engine itself may be implemented locally at the user's computing device, or may be implemented remotely at one or more other computing devices. In the latter case, the search engine may be implemented at a computer that is connected to the user's device via a data network such as the Internet, one or more wide area networks, and/or one or more local area networks.

In embodiments, the method described herein may comprise receiving, through a graphical user interface (GUI) displayed on a touchscreen, an indication of a first search term as indicated by a present user; receiving, through the GUI, an indication of a second search term; detecting movement of one of a first contact point associated with the indication of the first search term, and a second contact point associated with the indication of the second search term; and performing a search, based on the movement, using a logical combination of the first and second search terms.

The logical combination may comprise a logical AND function. The logical combination may comprise a logical OR function.

The receiving of the indication of the first search term may comprise identifying a term displayed at the first contact point and touched by the user on the touchscreen. The receiving of an indication of the second search term may comprise identifying a term displayed at a screen location to which the user has moved the second contact point on the touchscreen. The receiving of an indication of the second search term may comprise reading a previously used and stored search term, when the second contact point is determined to have moved in a predefined direction on the touchscreen. The receiving of the indication of the second search term may comprise identifying a search term descriptive of previously accessed content, when the second contact point is determined to have moved in a predefined direction on the touchscreen. The receiving of the indication of the second search term may comprise accessing a search term that was previously used by one or more other users that are demographically similar to the present user, when the second contact point is determined to have moved in a predefined direction on the touchscreen. The receiving of the indication of the second search term may comprise identifying the term that is displayed at the second contact point and that is dragged adjacent to the first search term. The receiving of the indication of the second search term may comprise identifying a term that is displayed at the second contact point and dragged over the first search term.

In embodiments, the apparatus described herein may comprise a processor; a first logic unit configured to receive, through a GUI displayed on a touchscreen, an indication of a first search term as indicated by a present user, and configured to receive, through the GUI, an indication of a second search term; a third logic unit configured to detect movement of one of a first contact point associated with the indication of the first search term, and a second contact point associated with the indication of the second search term; and a fourth logic unit configured to interface with a search logic unit, which is configured to perform a search, based on the movement, using a logical combination of the first and second search terms.

The logical combination may comprise a logical AND function. The logical combination may comprise a logical OR function.

In embodiments, the first logic unit may comprise logic configured to identify a term displayed at the first contact point and touched by the user on the touchscreen. In embodiments, the first logic unit may comprise logic configured to identify a term displayed at a screen location to which the user has moved the second contact point on the touchscreen. The first logic unit may comprise logic configured to read a previously used and stored search term, when the second contact point is determined to have moved in a predefined direction on the touchscreen. The first logic unit may comprise logic configured to identify a search term descriptive of previously accessed content, when the second contact point is determined to have moved in a predefined direction on the touchscreen. The first logic unit may comprise logic configured to access a search term that was previously used by one or more other users that are demographically similar to the present user, when the second contact point is determined to have moved in a predefined direction on the touchscreen. The first logic unit may comprise logic configured to identify the term that is displayed at the second contact point and that is dragged adjacent to the first search term. The first logic unit may comprise logic configured to identify a term that is displayed at the second contact point and dragged over the first search term.

In embodiments, the computer program product described herein may include at least one non-transitory computer readable medium having computer program logic stored therein, the computer program logic including logic to cause a processor to receive, through a GUI displayed on a touchscreen, an indication of a first search term as indicated by a present user, and receive, through the GUI, an indication of a second search term; logic to cause the processor to detect movement of one of a first contact point associated with the indication of the first search term, and a second contact point associated with the indication of the second search term; and logic to cause the processor to interface with a search logic unit, which is configured to perform a search, based on the movement, using a logical combination of the first and second search terms.

In embodiments, the logical combination may comprise a logical AND function. The logical combination may comprise a logical OR function.

In embodiments, the logic to cause the processor to receive of the indication of the first and second search terms may comprises logic to cause the processor to identify a term displayed at the first contact point and touched by the user on the touchscreen. The logic to cause the processor to receive indications of the first search term and second search term may comprise logic to cause the processor to identify a term displayed at a screen location to which the user has moved the second contact point on the touchscreen. The logic to cause the processor to receive indications of the first search term and second search term may comprise logic to cause the processor to read a previously used and stored search term, when the second contact point is determined to have moved in a predefined direction on the touchscreen. The logic to cause the processor to receive indications of the first search term and second search term may comprise logic to cause the processor to identify a search term descriptive of previously accessed content, when the second contact point is determined to have moved in a predefined direction on the touchscreen. The logic to cause the processor to receive indications of the first search term and second search term may comprise logic to cause the processor to access a search term that was previously used by one or more other users that are demographically similar to the present user, when the second contact point is determined to have moved in a predefined direction on the touchscreen. The logic to cause the processor to receive indications of the first search term and second search term may comprise logic to cause the processor to identify the term that is displayed at the second contact point and that is dragged adjacent to the first search term. The logic to cause the processor to receive indications of the first search term and second search term may comprise logic to cause the processor to identify a term that is displayed at the second contact point and dragged over the first search term.

The systems, methods, and computer program products described herein may provide a touchscreen-based user interface that allows the user to perform information searching on a mobile computing device, such as a tablet computer or smart phone. The user does not have to open a text entry window or type search terms using the small GUI keyboard typically provided by these devices. By moving one or two fingers in appropriate direction(s) across the touchscreen, a search may be easily specified by choosing displayed terms as search terms. Moreover, by using the appropriate gestures, a search may be broadened or narrowed by specifying additional search terms. This may be performed iteratively to allow the user to discover information, at various times narrowing or broadening a search.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A non-transitory computer readable medium encoded with a computer program that includes instructions to cause a processor to:
   define secondary search terms for a user based on one or more of metadata of content accessed by the user and queries associated with other users;
   present content at a device of the user;
   construct a query to include a first search term determined from the content based on a first finger gesture directed to the device, and to include one or more of the secondary search terms, including to perform one or more of,
      determine a number of the secondary search terms to include in the query based on an extent of a motion of a second finger gesture directed to the device,
      increase the number of the secondary search terms in the query based on the second finger gesture,
      decrease the number of secondary search terms in the query based on the second finger gesture,
      instruct a search engine to alter search parameters associated with a secondary search term of the query to expand a scope of the query based on the second finger gesture,
      permit the user to drag and stack multiple terms of the content over one another with finger gestures, define the first term to include the multiple terms, and order the multiple terms within the query based on an order in which the multiple terms are stacked relative to one another, and
      determine a second search term from the content based on the second finger gesture, and logically NOT the second search term in the query if the motion of the second finger gesture includes a rotational motion;
   submit the query to the search engine; and
   present results of the query at the device.

2. The non-transitory computer readable medium of claim 1, wherein the instructions include instructions to cause the processor to:
   determine the number of the secondary search terms to include in the query based on the extent of the motion of the second finger gesture.

3. The non-transitory computer readable medium of claim 1, wherein the instructions include instructions to cause the processor to:
   increase the number of the secondary search terms in the query based on the second finger gesture.

4. The non-transitory computer readable medium of claim 3, further including instructions to cause the processor to:
   increase the number of the secondary search terms in the query based on the extent of the motion of the second finger gesture.

5. The non-transitory computer readable medium of claim 1, wherein the instructions include instructions to cause the processor to:
   decrease the number of the secondary search terms in the query based the second finger gesture.

6. The non-transitory computer readable medium of claim 5, further including instructions to cause the processor to:
   decrease the number of the secondary search terms in the query based on the extent of the motion of the second finger gesture.

7. The non-transitory computer readable medium of claim 1, wherein the instructions include instructions to cause the processor to:
   instruct the search engine to alter search parameters associated with a secondary search term of the query to expand the scope of the query based on the second finger gesture.

8. The non-transitory computer readable medium of claim 1, wherein the instructions include instructions to cause the processor to:
   permit the user to drag and stack the multiple terms of the content over one another, define the first term to include the multiple terms, and order the multiple terms within the query based on the order in which the multiple terms are stacked relative to one another.

9. The non-transitory computer readable medium of claim 1, wherein the instructions include instructions to cause the processor to:
   determine the second search term from the content based on the second finger gesture, and logically NOT the second search term in the query if the motion of the second finger gesture includes the rotational motion.

10. The non-transitory computer readable medium of claim 1, further including instructions to cause the processor to:
  display the content at the device of the user based on content displayed on another device of the user.

11. An apparatus, comprising, a processor and memory configured to:
  define secondary search terms for a user based on one or more of metadata of content accessed by the user and queries associated with other users;
  present content at a device of the user;
  construct a query to include a first search term determined from the content based on a first finger gesture directed to the device, and to include one or more of the secondary search terms, including to perform one or more of,
    determine a number of the secondary search terms to include in the query based on an extent of a motion of a second finger gesture directed to the device,
    increase the number of the secondary search terms in the query based on the second finger gesture,
    decrease the number of secondary search terms in the query based on the second finger gesture,
    instruct a search engine to alter search parameters associated with a secondary search term of the query to expand a scope of the query based on the second finger gesture,
    permit the user to drag and stack multiple terms of the content over one another with finger gestures, define the first term to include the multiple terms, and order the multiple terms within the query based on an order in which the multiple terms are stacked relative to one another, and
    determine a second search term from the content based on the second finger gesture, and logically NOT the second search term in the query if the motion of the second finger gesture includes a rotational motion;
  submit the query to the search engine; and
  present results of the query at the device.

12. The apparatus of claim 11, wherein the processor and memory are further configured to:
  determine the number of the secondary search terms to include in the query based on the extent of the motion of the second finger gesture.

13. The apparatus of claim 11, wherein the processor and memory are further configured to:
  increase the number of the secondary search terms in the query based on the second finger gesture.

14. The apparatus of claim 13, wherein the processor and memory are further configured to:
  increase the number of the secondary search terms in the query based on the extent of the motion of the second finger gesture.

15. The apparatus of claim 11, wherein the processor and memory are further configured to:
  decrease the number of the secondary search terms in the query based the second finger gesture.

16. The apparatus of claim 15, wherein the processor and memory are further configured to:
  decrease the number of the secondary search terms in the query based on the extent of the motion of the second finger gesture.

17. The apparatus of claim 11, wherein the processor and memory are further configured to:
  instruct the search engine to alter search parameters associated with a secondary search term of the query to expand the scope of the query based on the second finger gesture.

18. The apparatus of claim 11, wherein the processor and memory are further configured to:
  permit the user to drag and stack the multiple terms of the content over one another, define the first term to include the multiple terms, and order the multiple terms within the query based on the order in which the multiple terms are stacked relative to one another.

19. The apparatus of claim 11, wherein the processor and memory are further configured to:
  determine the second search term from the content based on the second finger gesture, and logically NOT the second search term in the query if the motion of the second finger gesture includes the rotational motion.

20. The apparatus of claim 11, wherein the processor and memory are further configured to:
  display the content at the device of the user based on content displayed on another device of the user.

21. A computer-implemented method, comprising:
  defining secondary search terms for a user based on one or more of metadata of content accessed by the user and queries associated with other users;
  presenting content at a device of the user;
  constructing a query to include a first search term determined from the content based on a first finger gesture directed to the device, and to include one or more of the secondary search terms, wherein the constructing includes one or more of,
    determining a number of the secondary search terms to include in the query based on an extent of a motion of a second finger gesture directed to the device,
    increasing the number of the secondary search terms in the query based on the second finger gesture,
    decreasing the number of secondary search terms in the query based on the second finger gesture,
    instructing a search engine to alter search parameters associated with a secondary search term of the query to expand a scope of the query based on the second finger gesture,
    permitting the user to drag and stack multiple terms of the content over one another with finger gestures, define the first term to include the multiple terms, and order the multiple terms within the query based on an order in which the multiple terms are stacked relative to one another, and
    determining a second search term from the content based on the second finger gesture, and logically NOT the second search term in the query if the motion of the second finger gesture includes a rotational motion;
  submitting the query to the search engine; and
  presenting results of the query at the device.

22. The method of claim 21, wherein the constructing a query includes:
  the determining a number of the secondary search terms to include in the query based on an extent of a motion of the second finger gesture.

23. The method of claim 21, wherein the constructing a query includes:
  increasing the number of the secondary search terms in the query based on the second finger gesture.

24. The method of claim 23, wherein the increasing includes:
  increasing the number of the secondary search terms in the query based on the extent of the motion of the second finger gesture.

25. The method of claim 21, wherein the constructing a query includes:
  the decreasing the number of the secondary search terms in the query based the second finger gesture.

26. The method of claim 25, wherein the decreasing includes:
  decreasing the number of the secondary search terms in the query based on the extent of the motion of the second finger gesture.

27. The method of claim 21, wherein the constructing a query includes:
the instructing the search engine to alter search parameters associated with a secondary search term of the query to expand the scope of the query based on the second finger gesture.

28. The method of claim 21, wherein the constructing a query includes:
the permitting the user to drag and stack the multiple terms of the content over one another, define the first term to include the multiple terms, and order the multiple terms within the query based on the order in which the multiple terms are stacked relative to one another.

29. The method of claim 21, wherein the constructing a query includes:
determine the second search term from the content based on the second finger gesture, and logically NOT the second search term in the query if the motion of the second finger gesture includes the rotational motion.

30. The method of claim 21, wherein the constructing a query includes:
display the content at the device of the user based on content displayed on another device of the user.

* * * * *